June 26, 1934.        R. MILLER        1,964,130
MILLING AND LIKE CUTTING TOOL
Filed April 13, 1932      2 Sheets-Sheet 1

R. Miller
INVENTOR

By: Marks & Clerk
Att'ys.

June 26, 1934.   R. MILLER   1,964,130
MILLING AND LIKE CUTTING TOOL
Filed April 13, 1932   2 Sheets-Sheet 2
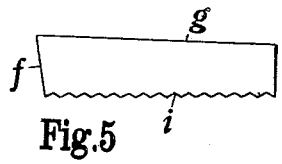
Fig.5
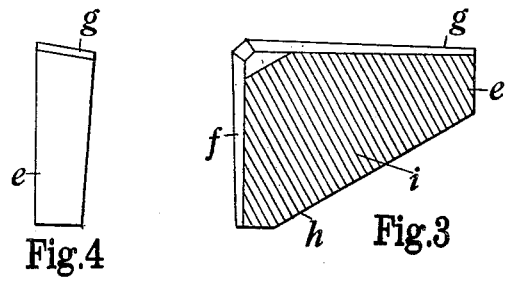
Fig.4   Fig.3
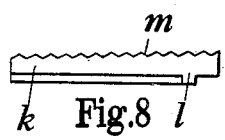
Fig.8
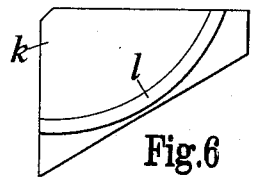 
Fig.6   Fig.7
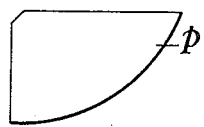 
Fig.9   Fig.10

Patented June 26, 1934

1,964,130

UNITED STATES PATENT OFFICE 1,964,130

MILLING AND LIKE CUTTING TOOL

Ralph Miller, Birmingham, England, assignor of one-half to Ernest Penn, London, England Application April 13, 1932, Serial No. 605,028
In Great Britain August 11, 1931

4 Claims. (Cl. 29—105)

This invention relates to milling and like cutting tools of the inserted tooth type, and has for its object to devise simple and effective means for securing the teeth or cutters to the tool holder or equivalent part, while permitting of adjustment of the tooth or cutter in relation to the tool holder as may be required to compensate for wear.

According to my invention I secure each tooth or cutter within a pocket or recess in the tool holder or equivalent part by means of a metal wedge plate secured against movement in the pocket or recess.

According to a further feature of the invention the wedge plate is formed with an arcuate rib or projection adapted to fit within a similarly formed groove or channel in the side of the pocket or recess.

According to a still further feature of the invention the adjacent faces of the tooth or cutter and wedge plate are serrated or similarly formed so that the tooth may be adjusted in the pocket radially or laterally or both.

Further features of the invention will be apparent from the description given hereafter.

In the two accompanying sheets of explanatory drawings:—

Figures 3, 4 and 5 are respectively rear view, end view and plan of one of a number of blades used in the cutter.

Figure 6 is a rear view, Figure 7 an end view and Figure 8 a plan of the wedge.

Figure 9 is an end view and Figure 10 a side view of a shim or packing plate.

Figure 1:
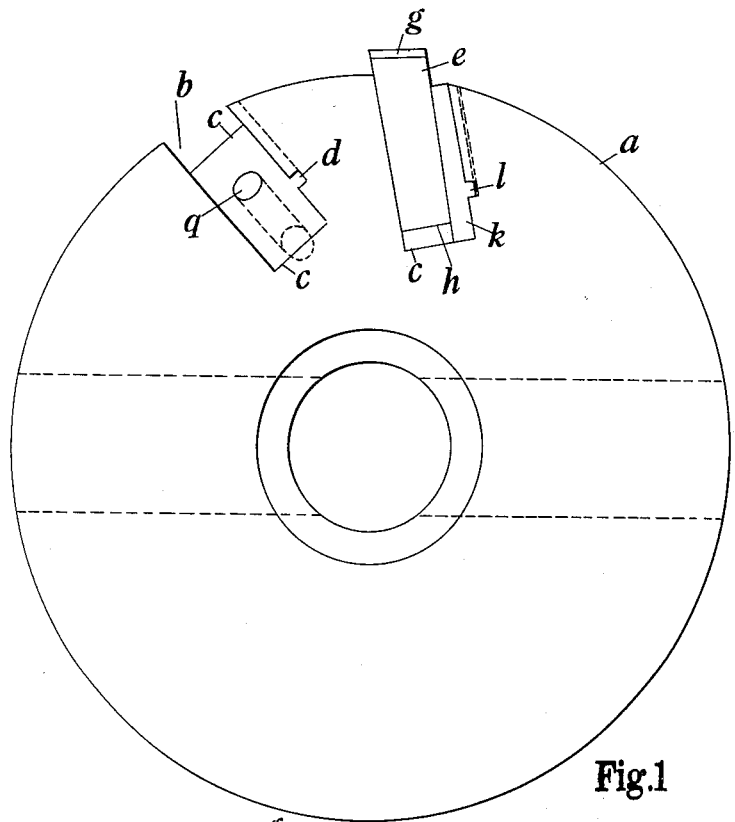
Figure 1 is an end elevation and Figure 2 a side elevation illustrating a milling cutter constructed in accordance with this invention, one gap and one cutter only being shown in the body part.
Figure 2:
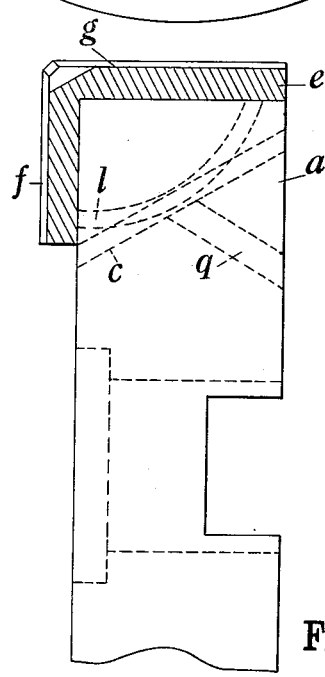

In carrying the invention into effect in the manner shown, there is formed in the periphery of the disc-like tool holder or body $a$ a plurality of recesses, pockets, or notches $b$ for the reception of the inserted teeth or cutting elements. In the drawings only two pockets are shown, but it will be understood that similar pockets are provided at equal distances apart all around the body. Each of such pockets in the example illustrated is formed with an inclined lower face $c$, and has in one of its side walls an arcuate groove or channel $d$ which may conveniently extend from one of the side faces of the disc to the periphery as shown in Figure 2. The space between the side walls is of uniform width, and preferably the pockets are disposed non-radially as shown, though radial pockets may be used if desired.

Each tooth or cutting element $e$ is of substantially right angled triangular form and the two edges enclosing the right angle may form cutting edges if, for example, the invention is applied to a side and face milling cutter. It will be noticed that the rear side of the blade (i. e. the nearmost one in Figure 3) is tapered relatively to the front side, and that the edges $f$, $g$ are each narrower at one end than at the other, the right hand end of $g$ in Figure 5 being narrower than the left hand end, and the bottom end of $f$ in Figure 4 being narrower than the top end. The lower inclined edge $h$ only is of uniform width. This configuration results from the fact that the blade is cut to a wedge form of which the edge $h$ forms one end of the wedge. The rear face of the wedge is also formed with ridges $i$ which lie at right angles to the edge $h$.

For the purpose of retaining the tooth in position in the pocket, there is provided in each pocket a removable wedge plate $k$ also of similarly triangular form and having an arcuate rib or projection $l$ adapted to fit within the similarly formed channel $d$ in the side wall of the pocket. One side of the rib is tangential to a line parallel to the lower or inclined edge of the wedge plate. By reason of the arcuate rib and the lower inclined face of the wedge plate which abuts against the inclined face $c$ of the pocket or recess, the wedge plate will be securely held in the pocket against radial or lateral movement. The front face of the wedge plate is formed with ridges $m$ similar to those on the cutter. When the wedge plate has thus been inserted in the pocket, the tooth may be driven in and will be securely held in place in the tool holder. When the cutter blade is driven into position the interengagement of the ridges on the blade and wedge causes the blade to move radially and laterally with respect to the body part. The final position of the blade depends on the position at which its ridges have been engaged with those of the wedge plate. Either lateral or radial adjustments can be effected by engaging the cutter ridges with appropriate ridges on the wedge plate. Thus if it is required to make the blade project to a greater extent beyond the side or the periphery of the body part, it is taken out and moved to a new position relatively to the wedge before being driven in again. But when it is required to make the blade project more or less beyond both the side and the periphery of the body part, the blade is detached, and a shim or thin packing piece $p$ is inserted behind the wedge plate before the blade is replaced and secured. It will be understood that if desired the various cutter blades may be arranged so that they extend either laterally or radially by different amounts from the notches. For some purposes it is advantageous to arrange the cutting edges of the blades spirally so that successive blades attack the work piece progressively.

Preferably the arcuate rib $l$ upon the wedge plate is kept as near the inclined edge as possible so that the shim may be made of reasonably large area, it being understood that the shim will be of substantially triangular form with one face curved to seat against the curved rib upon the shim lock.

The tooth and wedge plate may be made with a 4° or other suitable taper and in order to facilitate the removal of the tooth, I prefer to provide an aperture $q$ from the rear face of the body part through to the inclined lower surface of a pocket so that the tooth may be driven out by means of a suitable tool inserted through such aperture.

The invention is not to be limited to the foregoing application which is given by way of example only, as it may be applied with equal effect and like advantage to any form of cutting, milling, turning, boring reaming and other tools having inserted detachable teeth blades or like elements, and the form of the interengaging rib and channel and the relationship to the inclination of the lower face of the pocket or recess may be suitably modified depending upon any practical requirements that may have to be fulfilled. This, instead of the rib $l$ a peg or pegs may be provided on the wedge plate for engaging a corresponding recess or recesses in the adjacent face of the notch $b$, it being always necessary to effect an engagement between the wedge plate and holder which will not allow relative movement of the wedge plate. Also it is not essential to form the notches in the holder with inclined lower faces $c$ as in some cutters such faces may be arranged parallel with the peripheral cutting edges. Further the ridges instead of being arranged obliquely may be arranged parallel with the side or peripheral edges of the blades. The use of oblique ridges and obliquely disposed wedge surfaces on the parts $e$, $k$ is that they enable either radial or lateral adjustments of the blades to be obtained in a very convenient manner.

Having thus described my invention what I claim as new and desire to secure by Letters Patent is:—

1. In milling and like cutting tools of the type specified, the combination with a notched holder, of a wedge shaped cutter blade adapted to be inserted in a notch in the holder, and a wedge plate adapted to secure the blade in position, a side of the plate and the adjacent side of the notch being formed with interengaging parts which are arcuate in a lengthwise direction about an axis at right-angles to the said sides and which hold the plate against both lateral and radial movements.

2. In milling and like cutting tools of the type specified, the combination of a notched blade holder, each notch having parallel sides and a base inclined to the longitudinal axis of the holder, a wedge shaped cutter blade having an inclined inner edge, and a wedge plate for securing the blade, the said plate having an inclined edge arranged to abut on the inclined edge in the notch and being provided at one side with a projection which is arcuate in a lengthwise direction, and one side of the notch having a corresponding arcuate groove for receiving the said projection, substantially as described.

3. In milling and like cutting tools of the type specified, the combination of a notched blade holder, each notch having parallel sides and a base inclined to the longitudinal axis of the holder, a wedge shaped cutter having an inclined inner edge, and formed on one side with ridges at right angles to the inclined edge, and a wedge plate formed with ridges corresponding to those on the blade for securing the blade in position, the said plate having an inclined edge arranged to abut on the inclined edge of the notch and being provided at one side with a projection which is arcuate about an axis at right angles to that side, and one side of the notch having a corresponding arcuate groove for receiving the said projection, substantially as described.

4. In milling and like cutting tools as claimed in claim 1, a blade and wedge plate each having edges arranged at right-angles to each other, and interengaging ridges formed obliquely in relation to said edges on the adjacent faces of said blade and wedge plate.

RALPH MILLER.